(12) United States Patent  
Gamaleldin et al.

(10) Patent No.: US 12,450,320 B2  
(45) Date of Patent: Oct. 21, 2025

(54) SYSTEMS AND METHODS FOR MANAGEMENT OF MODELS DATABASE

(71) Applicant: Saudi Arabian Oil Company, Dhahran (SA)

(72) Inventors: Mahmoud E. Gamaleldin, Cairo (EG); Abdulrahman M. Alsuhaibani, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 81 days.

(21) Appl. No.: 18/583,496

(22) Filed: Feb. 21, 2024

(65) Prior Publication Data  
US 2025/0265319 A1  Aug. 21, 2025

(51) Int. Cl.  
*G06F 21/31* (2013.01)  
*G06F 21/62* (2013.01)

(52) U.S. Cl.  
CPC ........ *G06F 21/316* (2013.01); *G06F 21/6245* (2013.01); *G06F 2221/2141* (2013.01)

(58) Field of Classification Search  
CPC .............. G06F 21/316; G06F 21/6245; G06F 2221/2141  
See application file for complete search history.

(56) References Cited

U.S. PATENT DOCUMENTS

| | | | |
|---|---|---|---|
| 8,112,300 B2 * | 2/2012 | Harper ................... | G06N 3/126 705/7.26 |
| 2019/0164100 A1 * | 5/2019 | Rotta ................... | G06Q 10/067 |
| 2020/0050443 A1 * | 2/2020 | Edelsten ................ | G06N 3/045 |

(Continued)

FOREIGN PATENT DOCUMENTS

CN    119648143 A  *  3/2025

OTHER PUBLICATIONS

Lin, Heng-You, et al. "Change request management in model-driven engineering of industrial automation software." 2015 IEEE 13th International Conference on Industrial Informatics (INDIN). (Year: 2015).*

(Continued)

*Primary Examiner* — Michael R Vaughan  
(74) *Attorney, Agent, or Firm* — DINSMORE & SHOHL LLP

(57) ABSTRACT

Systems and methods for providing controllable hydrocarbon parameters to at least one of a controllable hydrocarbon infrastructure asset or a controllable hydrocarbon operational asset are described. One embodiment includes an engineering model transaction system that receives, from a client device, a request for an engineering model at an engineering model repository interface configured as an access point to an engineering model repository maintaining a database of engineering models; receives sensor data from the sensor data memory; processes the sensor data with a revised engineering model to obtain at least one configuration parameter for a controller associated with the at least one of the controllable hydrocarbon infrastructure asset or the controllable hydrocarbon operational asset; and communicates the at least one configuration parameter to the controller associated with the at least one of the controllable hydrocarbon infrastructure asset or the controllable hydrocarbon operational asset.

20 Claims, 8 Drawing Sheets

(56) References Cited

U.S. PATENT DOCUMENTS

| | | | | |
|---|---|---|---|---|
| 2020/0104224 | A1* | 4/2020 | Katou | G06F 9/542 |
| 2021/0088867 | A1* | 3/2021 | Nagel | G01N 21/8851 |
| 2021/0390455 | A1* | 12/2021 | Schierz | G06N 20/00 |
| 2022/0230092 | A1* | 7/2022 | Ferreira | G06N 20/00 |
| 2022/0335185 | A1* | 10/2022 | Kristensen | E21B 47/005 |
| 2023/0027145 | A1* | 1/2023 | Abelha Ferreira | G06F 18/10 |
| 2023/0385441 | A1* | 11/2023 | Donderici | B60W 60/001 |
| 2024/0144141 | A1* | 5/2024 | Cella | G06Q 30/0206 |
| 2025/0036098 | A1* | 1/2025 | SayyarRodsari | G05B 19/41885 |
| 2025/0044767 | A1* | 2/2025 | SayyarRodsari | G05B 19/4097 |

OTHER PUBLICATIONS

ETAP Powering Success, "Getting Started with NetPM", ETAP/Operation Techology, 11 pages, 1991-2019.

* cited by examiner

702

| UserID 708 | Name 710 | Contact info 712 | Account Status 714 | DigitalSignature 716 |
|---|---|---|---|---|
| ID1 | J.W. | Email_1 704 | Active 704 | Sig_1 704 |
| ID2 | S.C. | Email_2 704 | Active 704 | Sig_2 704 |

704

| ModelID 718 | Facility_Name 720 | Location 722 | Description 724 | Equipment_Count 726 | Model_Size 728 | Point_of_Contact 730 |
|---|---|---|---|---|---|---|
| 3001 | Main Refinery Area | Location_1 | Core Network Backbone Model | 1023 Units | ~2GB | Contact_1 |
| 3002 | Residential Compound 3 | Location_2 | Power Distribution for Compound 3 | 342 Units | ~0.8GB | Contact_2 |

706

| RequestID 732 | UserID 734 | ModelID 736 | Check-out TS 738 | Check-in TS 740 | Edit_Access 742 | Request_Status 744 | POC_Approval 746 | Admin_Approval 748 |
|---|---|---|---|---|---|---|---|---|
| 1001 | ID1 | 3001 | TS_1 | TS_3 | Y | Closed | Y | Y |
| 1002 | ID2 | 3002 | TS_2 | Null | N | Active | Y | Null |

FIG. 7

SYSTEMS AND METHODS FOR MANAGEMENT OF MODELS DATABASE

FIELD

The present disclosure relates to systems and methods for managing and controlling access to engineering models.

TECHNICAL BACKGROUND

Large organizations, like oil and gas companies, rely on complex engineering models and simulations to analyze their systems and facilities. For example, an electrical analysis program can be used to conduct power system studies, set protection settings, and provide technical support for operations and maintenance. Such engineering models can be utilized by many users (e.g., thousands) across various departments to support current projects as well as support future expansion plans. Keeping such a vast database of hundreds of engineering models up-to-date and properly integrated poses major challenges. For example, given the various departments and number of users that may use or otherwise access an engineering model, it may be difficult to coordinate engineering model updates and consolidate changes to the models both interdepartmentally and amongst various systems and users. Further, maintaining model accuracy and the quality of equipment data across one or more models is labor-intensive and requires extensive manual oversight. Additionally, human labor is required to verify and track model revisions after project completion.

SUMMARY

Models management is an important aspect of modern business operations, enabling organizations to effectively design, analyze, and optimize complex systems and processes. This discipline encompasses the creation, manipulation, and utilization of various types of models to represent the dynamic real-world systems, such as computer simulations, mathematical models, and graphical representations. Effective system models management facilitates decision-making, resource allocation, and performance improvement across diverse fields, including engineering, finance, healthcare, and logistics. By leveraging advanced modeling techniques, organizations can gain valuable insights into the behavior and interdependencies of the systems they operate, leading to more informed strategies and enhanced operational efficiency. Systems and method for providing controllable hydrocarbon parameters to at least one of a controllable hydrocarbon infrastructure asset or a controllable hydrocarbon operational asset are disclosed. On embodiment includes a method for providing controllable hydrocarbon parameters to at least one of a controllable hydrocarbon infrastructure asset or a controllable hydrocarbon operational asset. Some embodiments include receiving, from a client device, a request for an engineering model at an engineering model repository interface configured as an access point to an engineering model repository maintaining a database of engineering models; logging the request for the engineering model into an audit repository; authenticating, by an authenticator, an identity of a user based on credentials associated with the request for the engineering model; determining, by the authenticator and the engineering model repository, an access level permitted for the authenticated user; selectively allowing access to the requested engineering model according to the determined access level and log access to the requested engineering model into the audit repository; receiving a change request associated with the engineering model and log the received change request into the audit repository; based on the determined access level, approving the change request and commit a revised engineering model into the engineering model repository; determining, by an engineering model change parser, differences between the requested engineering model and the revised engineering model; parsing entries logged within the audit repository to locate transaction records that identify prior users of the requested engineering model based on the determined differences between the requested engineering model and the revised engineering model; sending at least one notification message to one or more of the identified prior users of the requested engineering model, wherein the at least one notification includes at least one of the logged requests for the engineering model, logged engineering model change requests, or logged engineering model access transactions from the audit repository. Some embodiments include receiving sensor data from sensor data memory; processing the sensor data with the revised engineering model to obtain at least one configuration parameter for a controller associated with the at least one of the controllable hydrocarbon infrastructure asset or the controllable hydrocarbon operational asset; and communicating the at least one configuration parameter to the controller associated with the at least one of the controllable hydrocarbon infrastructure asset or the controllable hydrocarbon operational asset, wherein upon receiving the at least one configuration parameter, the controller modifies at least one operating condition of the at least one of the infrastructure asset or the operational asset.

In another embodiment, a system includes at least one sensor coupled to a first network, the at least one sensor configured to obtain sensor data associated with the at least one of the controllable hydrocarbon infrastructure asset or the controllable hydrocarbon operational asset; an engineering model transaction system that includes a processor, a sensor data memory, a memory component, and a configuration parameter output translation module, the sensor data memory storing sensor data received from the first network and associated with the at least one of the controllable hydrocarbon infrastructure asset or the controllable hydrocarbon operational asset, and the memory component storing engineering model data processing instructions. In some embodiments, the engineering model transaction system performs at least the following: receives, from a client device, a request for an engineering model at an engineering model repository interface configured as an access point to an engineering model repository maintaining a database of engineering models; logs the request for the engineering model into an audit repository; authenticates, by an authenticator, an identity of a user based on credentials associated with the request for the engineering model; determines, by the authenticator and the engineering model repository, an access level permitted for the authenticated user; selectively allows access to the requested engineering model according to the determined access level and log access to the requested engineering model into the audit repository; receives a change request associated with the engineering model and log the received change request into the audit repository; based on the determined access level, approves the change request and commit a revised engineering model into the engineering model repository; determines, by an engineering model change parser, differences between the requested engineering model and the revised engineering model; parses entries logged within the audit repository to locate transaction records that identify prior users of the requested engineering model based on the determined differences between the requested engineering model and the revised engineering model; sends at least one notification message to one or more of the identified prior users of the requested engineering model, wherein the at least one notification includes at least one the logged requests for the engineering model, logged engineering model change requests, or logged engineering model access transactions from the audit repository; receive the sensor data from the sensor data memory; processes the sensor data with the revised engineering model to obtain at least one configuration parameter for a controller associated with the at least one of the controllable infrastructure asset or the controllable hydrocarbon operational asset; and communicates the at least one configuration parameter to the controller associated with the at least one of the controllable hydrocarbon infrastructure asset or the controllable hydrocarbon operational asset, wherein upon receiving the at least one configuration parameter, the controller modifies at least one operating condition of the at least one of the infrastructure asset or the operational asset.

Other embodiments provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

These and additional features provided by the embodiments of the present disclosure will be more fully understood in view of the following detailed description, in conjunction with the drawings.

BRIEF DESCRIPTION OF THE DRAWINGS

The following detailed description of the present disclosure may be better understood when read in conjunction with the following drawings in which:

FIG. 7 depicts data structures utilized by the engineering model transaction system, in accordance with examples of the present disclosure, according to embodiments provided herein.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Figure 1:
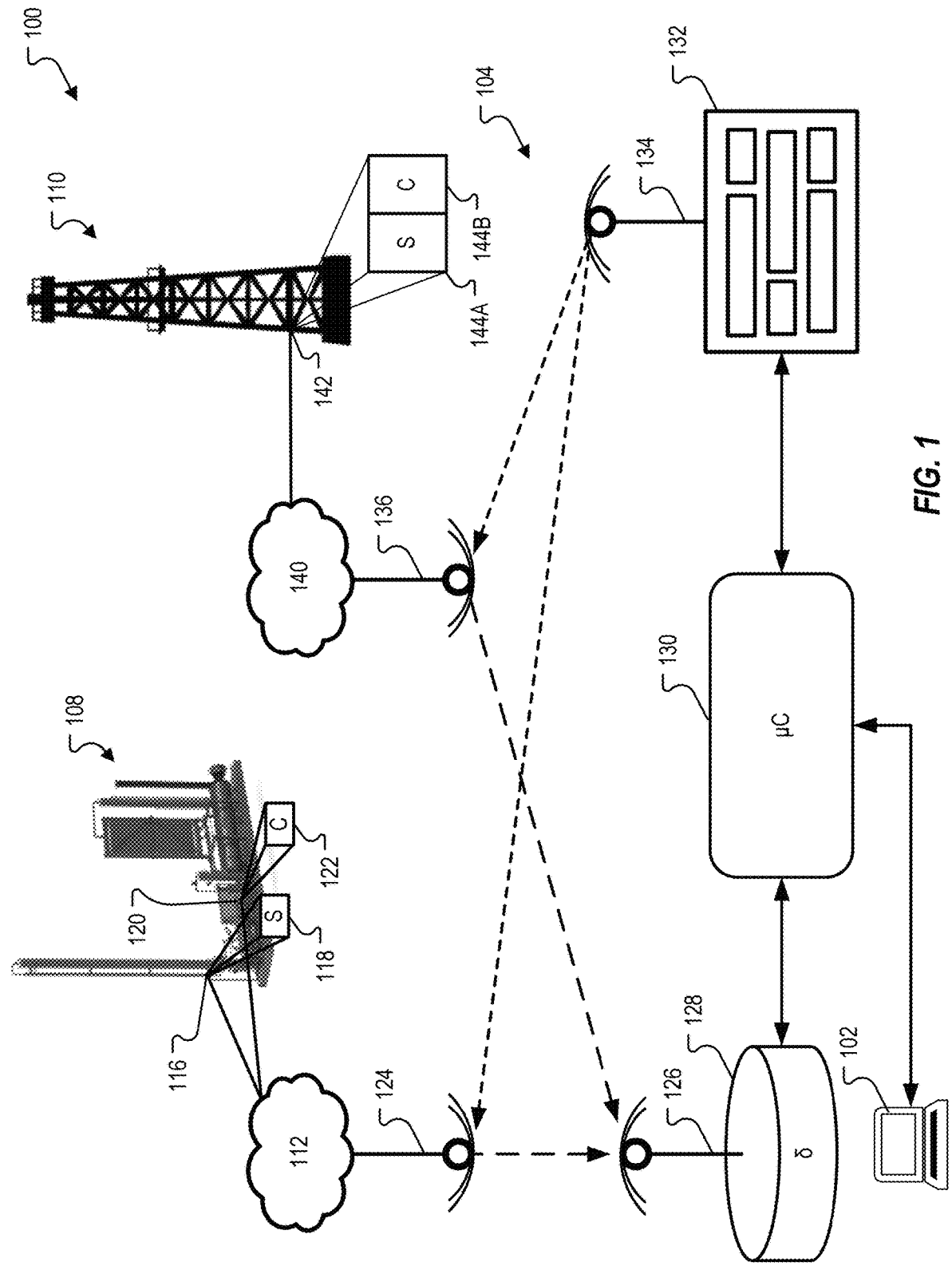
FIG. 1 depicts details of a system for providing controllable hydrocarbon parameters based on managed engineering models, according to embodiments provided herein.

Aspects of the present disclosure are directed to systems and methods for providing controllable hydrocarbon parameters based on managed engineering models and further includes an engineering model transaction system for securing and managing access to engineering models employed in infrastructure lifecycle processes. This engineering model transaction system facilitates unified, policy-driven access to models and ensures accountability in model management. In examples, engineering models comprise multidimensional digital representations of physical infrastructure assets and connected delivery networks owned and/or operated by organizations. Such engineering models may contain layered technical parameters directed to assets (e.g., buildings, equipment, raceways, etc.) and specifications (e.g., schematics, measurements, etc.) as well as operational dependencies (e.g., roofing material impacts water collection system). Engineering teams across functions can leverage engineering models for impact assessment studies when contemplating major upgrades, technology transition programs, decommissioning of outdated equipment, or integration following new capital additions through expansion projects.

Over time, spanning multiple years and various stages of infrastructure lifecycle operations, authoritative engineering models may be distributed among different user groups and third-party engineers to meet specialized analytical requirements. For example, contracted construction partners can receive engineering models, or portions of engineering models, containing zones they are building; electrical maintenance teams can access and potentially modify one-line diagrams of areas they service; and piping engineers can download linked schematics of areas needing retrofits to analyze proposed equipment modifications prior to service or replacement. That is, different engineering groups can access portions of engineering models related to the sub-components they focus on, like electrical teams may view one-line diagrams and/or mechanical teams may review three-dimensional (3D) computer aided drawing (CAD) constructs. Due to the ongoing and complex nature of construction and other modifications, changes in infrastructure and their corresponding engineering models often happen in isolated segments. This compartmentalization can limit one group's understanding of how their alterations to an engineering model might affect or intersect with the work of another group. For example, planning teams modelling a new oil well location may position additional pumping facilities in a desired location without accounting for ripple thermal effects on adjacent facilities. Similarly, a newly engineered access road may alter landscape drainage assumptions made for in-use water harvesting reservoir models. Alternatively, tweaks to new facility roof architecture may influence rainwater drainage assumptions made earlier for adjacent watershed reservoir sizing models.

This isolated, domain-specific approach carries the risk of fragmenting authoritative engineering models over time. Primarily, this happens when a team's model changes specific to their own areas without sufficiently considering potential collateral interdependencies. Given that infrastructure components may be intrinsically connected through various mechanisms such as mass flows, heat transfers, and shared environmental factors, modifications made by one group can materially alter the operation and assumptions about assets outside their immediate scope. Without incorporating an understanding of these interdependencies into their modeling, there is a growing risk that the engineering models will increasingly diverge from the actual field conditions through successive iterations. This divergence not only affects immediate project outcomes but can also lead to long-term inefficiencies and potential safety hazards in the infrastructure system.

Thus, an engineering model transaction system can reduce or prevent such fragmentation by requiring cross-functional change impact reviews, creating full traceability across approved or rejected derivative engineering models, as well as periodically forcing decentralized groups to consolidate local edits into master engineering models that accurately reflect current field conditions.

Aspects of the engineering model transaction system mitigate issues related to engineering model fragmentation through several aspects: version control to track changes over time, access transparency to ensure visibility of who is making changes, and modification accountability to record the reasons and impacts of alterations. Thus, engineering reference models may be stored in a centralized repository, ensuring consistency and ease of access. The engineering model transaction system also enables any derivative engineering models to maintain a digital link to their original base models. This connection is supported by traceability frameworks, which, alongside documentation and relevant notes, provide detailed insights into the ongoing modifications being made by specific groups, such as engineering groups. This comprehensive approach ensures that changes to engineering models are not only well-managed but also thoroughly documented, promoting an integrated and coherent development process across different organizational teams.

FIG. 1 depicts a system 100 for providing controllable hydrocarbon parameters based on managed engineering models and further includes an engineering model transaction system 104 configured to manage access and changes to an engineering model. A controllable hydrocarbon parameter can include an operational variable or set point, such as temperature, pressure, flow rate, etc., that impacts the functioning of a controllable hydrocarbon operational asset and/or a controllable hydrocarbon infrastructure asset. In examples, a controllable hydrocarbon operational asset denotes machinery, equipment and installations directly involved in activities like hydrocarbon processing, transport and distribution. Examples include pipelines, cryogenic plants, well pads, pumps. Controllable hydrocarbon infrastructure assets represent ancillary systems like power, water and buildings that enable and support operations of hydrocarbon facilities. Examples include power stations, water treatment plants, control rooms and telemetry networks. Controllable hydrocarbon parameters can be monitored and optimized in real-time to improve performance. In examples, the system 100 obtains sensor data from one or more industrial facilities, processing plants, operational sites, or other equipment and/or assets. In some examples, the sensor data 118 is obtained from one or more operational sensors 116 of a hydrocarbon processor 108 representing processing equipment used in hydrocarbon operations, such as oil refineries, gas processing plants, petrochemical plants, etc. Examples of operational sensors 116 include but are not limited to temperature sensors, speed sensors, flow sensors, gas detectors, power monitors, etc. Example sensor data 118 can include, but is not limited to, temperature data, speed data, flow data, gas detection data (e.g., concentration, binary yes/no, etc.), and/or power data (e.g., energy, volts, amps, etc.). Sensor data 118 from operational sensor(s) 116 can be transmitted from the sensor and control network 112 via transmitters 124 and received at a receiver 126. The received sensor data can then be stored in a sensor data memory 128, which may be configured as any conventional or yet-to-be developed structure for storing sensor data, such as a database.

An engineering model data processor 130 analyzes the sensor data 118 stored in the sensor data memory 128 using one or more managed engineering models. Such analysis is configured to update one or more configuration parameters. For example, based on the sensor data 118, a managed engineering model may require one or more configuration parameters for an industrial facility, processing plant, operational site, or other equipment and/or asset to change. Accordingly, the configuration parameter output translation module 132 can create instructions to implement the results of the analysis (e.g., modified configuration parameter) from the engineering model data processor 130. The instructions can then be transmitted from the transmitter 134 and received at the transmitter/receiver 124. The sensor and control network 112 can provide control data 122 including the updated configuration parameter to a controller 120 such that the controller 120 can implement the updated configuration parameter. Thus, the configuration parameter of the hydrocarbon processor 108 representing processing equipment used in hydrocarbon operations, such as oil refineries, gas processing plants, petrochemical plants is based on a specific engineering model that is managed or otherwise maintained at the engineering model data processor 130.

In some examples, the sensor and controller may be integrated. For example, the system 100 may include one or more drilling rigs 110. Similar to the hydrocarbon processor 108, the drilling rig 110 includes a sensor and control network 140 that interconnects one or more sensor/controller devices 142. In examples, the drilling rig 110 gathers sensor data 144A on drilling operation parameters and can receive control parameter 144B for adjusting drilling parameters. Examples of sensor data 144A can include, but not limited to, temperature data, speed data, flow data, gas detection data (e.g., concentration, binary yes/no, etc.), and/or power data (e.g., energy, volts, amps, etc.). The sensor data 144A from the drilling rig sensors of the one or more sensor/controller devices 142 is transmitted via transmitters 136 to be stored in the sensor data memory 128. The engineering model data processor 130 utilizes the drilling rig sensor data 144A along with managed engineering models to determine updated configuration parameters. The configuration parameter output translation module 132 can create instructions to implement the results of the analysis (e.g., modified configuration parameter) from the engineering model data processor 130. The instructions can then be transmitted from the transmitter 134 to the transmitter/receiver 136 to adjust control parameters 144B at the drilling rig 110 sensor/controller 142. For example, the sensor and control network 140 can provide a control parameter 144B to one or more controller devices of the one or more sensor/controller devices 142 to be updated or otherwise implemented at the drilling rig 110. Thus, the configuration parameter of the drilling rig 110 is based on a specific engineering model that is managed or otherwise maintained at the engineering model data processor 130.

In some examples, a computing device 102 may make one or more changes to the engineering model used by the engineering model data processor 130. In some instances, the changed engineering model, prior to being used by the engineering model data processor 130, may be subjected to one or more verification processes such that updated configuration parameters resulting from the analysis of the engineering model data processor 130 using sensor data from the sensor data memory 128, do not inadvertently impact, in a negative way, other downstream facility elements. For example, when a user attempts to edit an engineering model for a compressor by increasing horsepower model change simulator of the engineering model data processor 130 can cross-check the downstream facilities connecting to the compressor, which may include valves, piping networks, and other processing equipment that rely on the compressor discharge pressure levels. Thus, the engineering model data processor 130 can detect if the proposed compressor retrofit would overload any downstream components due to the added horsepower capability.

Any downstream facility elements flagged at risk of exceeding process ratings based on model changes can trigger an alert, which notifies a user to adjust the proposed edits to the model. In some examples, the notification can include guidance specifying alternative horsepower upgrade limitations, relief valve additions or other risk mitigation measures to explore enabling the compressor retrofit without disrupting interconnected dependent devices. Upon the necessary model adjustments, the validated and optimized changes can then be committed to a model repository for future use and/or retrieval.

In addition to a user utilizing a computing device 102 to make changes to an engineering model to obtain and/or set one or more configuration parameters, other stakeholders may require access to the same engineering model. For example, a planning department may access an engineering model needed for the planning and execution of infrastructure projects. The planning department may coordinate with other departments to ensure that all engineering models adhere to the established policies and reflect accurate, up-to-date information regarding the organization's assets. A field-engineering group may interact directly with the engineering model for on-site field applications. A project support group can assists in facilitating the flow of engineering models between an engineering model repository and the various operational teams. For example, the project support group can ensure that all project-related engineering models are current and available, aiding in the seamless execution of project tasks across multiple departments.

External contractors may be granted access to one or more engineering models based on their specific project roles and requirements. This access allows external contractors to obtain relevant portions of engineering models necessary for their scope of work; in some examples, external contractors may only access a portion of an engineering model, thereby maintaining the integrity and security of the broader model. Alternatively or in addition, external contractors may have access to an entire engineering model. As previously described, due to the ongoing and complex nature of construction and other modifications, changes to engineering models often happen in isolated segments, thereby compartmentalization and limiting one group's understanding of how their alterations to an engineering model might affect or intersect with the work of another group. Accordingly, the engineering model data processor 130 manages access to engineering models to ensure that the engineering models are not only secure and accessible but also current and reflective of all changes in the field, thereby ensuring that the configuration parameters provided to one or more assets, such as hydrocarbon processor 108 and/or 110, are based on a vetted model where modifications to such model may be contingent upon stakeholder approval and/or notification.

Figure 2:
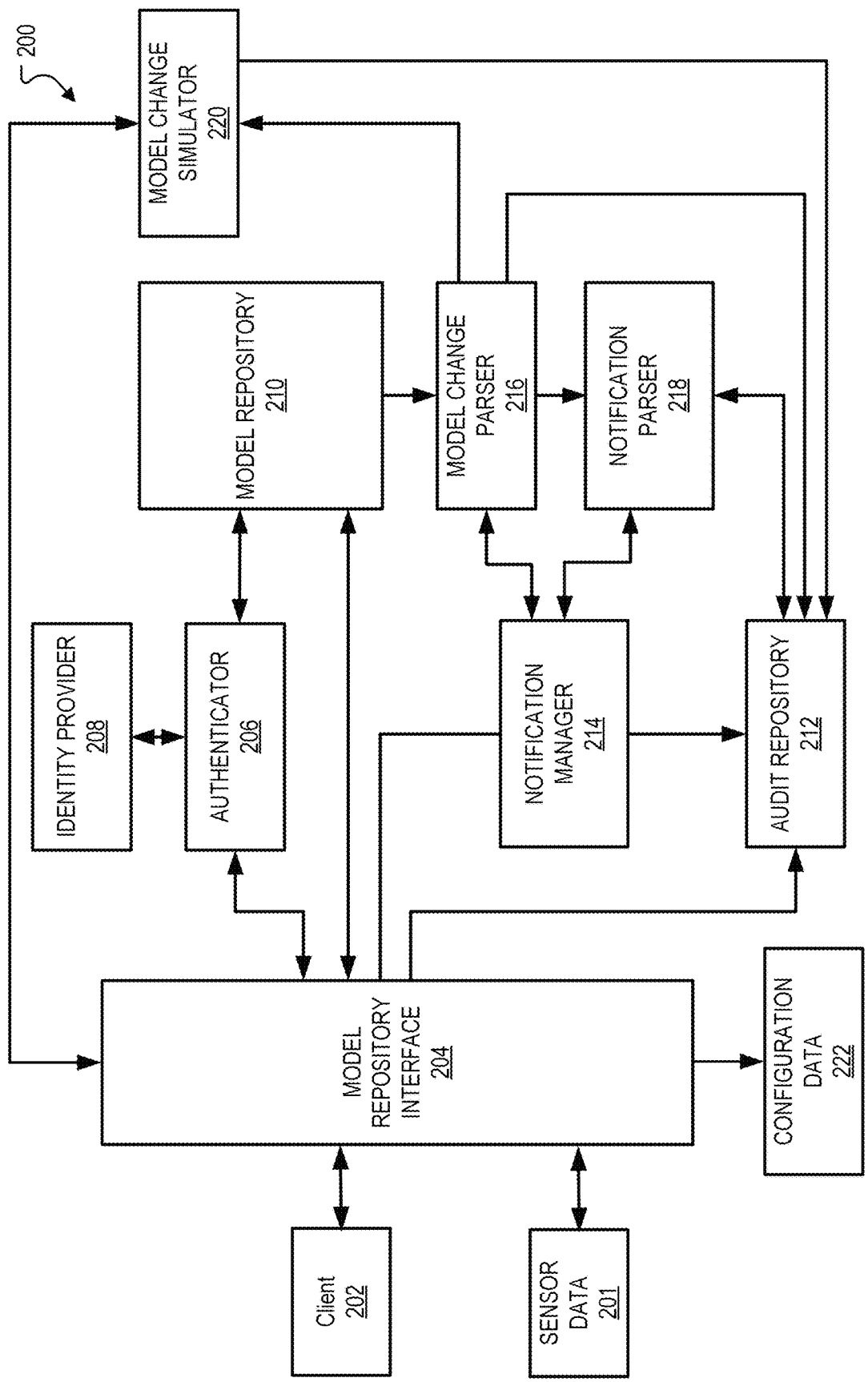
FIG. 2 depicts details of an engineering model transaction system that manages access and changes to an engineering model that may be used by one or more stakeholders, according to embodiments provided herein.

Referring now to FIG. 2, the engineering model data processor 130 may include engineering model transaction system 200 that manages access and changes to an engineering model that may be used by one or more stakeholders and/or one or more systems 100 (FIG. 1) that provide controllable hydrocarbon parameters. The engineering model transaction system 200 may allow a client 202, which represents a user-computing device through which a user initiates engineering model access and change requests, to access an engineering model located in an engineering model repository 210. An engineering model repository interface 204 acts as an access point to an engineering model repository 210 which maintains a database of engineering model data models relevant to the hydrocarbon processor 108 representing processing equipment used in hydrocarbon operations, projects management, engineering services or utility industry such as oil refineries, gas processing plants, petrochemical plants, drilling rigs 110 or utility company, and other infrastructure assets. The engineering model repository interface 204 handles model queries from clients 202 and enables verification of user credentials and access privileges prior to releasing any model data as per established data governance protocols.

In examples, an authenticator 206 works in conjunction with the identity provider 208 to authenticate users requesting access to engineering models. The identity provider 208 is an authority that manages end user identities and access entitlements within the engineering model transaction system 200 environment per data security guidelines. The authenticator 206 module leverages the identity provider 208 to verify identities and authorize model access when engineering model requests are received via the engineering model repository interface 204. In some examples, access to a model may be dependent on the engineering model itself; for example, the engineering model may contain one or more permissions or permissions levels specific to one or more users or groups. Thus, the authenticator 206 may query the engineering model repository 210 to obtain specific access permission for an engineering model. In other examples, access to one or more engineering models may be provided by the identity provider 208 and/or the authenticator 206. Together, the engineering model repository interface 204 and authenticator 206 serve as policy enforcement points that ensure verified users are able to retrieve engineering models using a client 202 or device, based on their predefined access designations maintained at the identity provider 208 and/or with an engineering model in the engineering model repository 210.

The engineering model repository 210 is a centralized and secured data store containing engineering model data files and associated metadata relevant to assets under management. The engineering model repository 210 may include version control capabilities to maintain histories of model changes and edits to enable full engineering model auditability. Access mechanisms like data encryption, access control lists and authentication protocols prevent unauthorized extraction of sensitive engineering model information. An audit repository 212 operates as an immutable record keeper, chronologically archiving all model access transactions, file extracts, manipulations, notifications and identity verifications conducted by end users of the engineering model transaction system 200. The comprehensive logs within the audit repository 212 facilitate internal audits, security analytics and forensic investigations around engineering model governance. A notification manager 214 automatically generates notification messages to stakeholders in response to events associated with engineering models that are tracked in the engineering model repository 210 and audit repository 212. The notification manager can include preset messaging templates that are parameterized based on transaction metadata attributes from repositories 210 and 212.

A model change parser 216 may include parsing rules and/or instructions to traverse revisions of the same engineering model data and catalog granular differences like equipment updates, operating parameter changes and data corrections. The parsed change sets become inputs for downstream notification generation. For example, the notification parser 218 can examine entries logged within the audit repository 212 to identify transaction records needing stakeholder notifications. The notification parser 218 selects audit history events like model extractions, failed access attempts, parameter edits, simulations, etc. to pass to the notification manager 214 for communicating trends to respective personnel.

The model change simulator 220 represents an automation module to propagate edits made to engineering models within the engineering model repository 210 to a digital twin module that duplicates facility operations using a simulation environment fed by real-time sensor data streams. For example, sensor data 118 (FIG. 1) can be received as sensor data 201 at the engineering model repository interface 204. The received sensor data can be fed to a digital twin representing a latest engineering model. In some examples, the digital twin may recommend an updated control parameter that is provided to the configuration parameter output translation module 132 (FIG. 1) as configuration data 222. In some examples, ongoing comparison of the simulated digital twin output versus the sensor data streams can detect model data discrepancies indicating a need for device configuration updates (e.g., via configuration data 222) to synchronize with recent engineering model modifications.

In some examples, the model change simulator 220 utilizes one or more machine learning models to analyze effects of engineering model modifications proposed by users against infrastructure and/or operational assets, such as hydrocarbon processor 108 (FIG. 1) and/or drilling rigs 110 (FIG. 1). Thus, prior to committing any model changes into the engineering model repository 210, the model change simulator 220 checks for inconsistencies or continuity gaps that would impact operations at the infrastructure assets directly affected by an updated configuration parameter and/or indirectly affected as a downstream entity.

For example, when a user attempts to edit the engineering model for a compressor by increasing horsepower, the model change simulator 220 cross-checks the downstream facilities connecting to the compressor outlet including valves, piping networks and processing equipment relying on the compressor discharge pressure levels. Using networked asset topology knowledge combined with machine learning inferences, the model change simulator 220 detects if the proposed compressor retrofit would overload any downstream components due to the added horsepower capability. Any downstream infrastructure and/or operational asset flagged at risk of exceeding process ratings based on engineering model changes can trigger simulator alerts, which may notify the requesting model user to adjust the proposed edits. Guidance can specify alternative horsepower upgrade limitations, relief valve additions or other risk mitigation measures to explore enabling the compressor retrofit without disrupting interconnected dependents. Upon the necessary model adjustments, the validated and optimized changes can then be committed to the engineering model repository 210 for future retrieval and use by the engineering model data processor 130.

The model change simulator 220 can also generate notifications to stakeholders predicted to be impacted by proposed model changes even if their assets are not directly flagged at risk. For example, adjusting the discharge temperature set point for a heater may alter feed properties to a connected distillation column, in turn impacting the tower's separation efficiency and duty cycles. So notifications would proactively be sent to both the heater stakeholder as well as the connecting column operators enabling collaborative validation of model edits prior to implementation. Upon the necessary model adjustments and based on stakeholder input, the validated and optimized changes can then be committed to the engineering model repository 210 for future retrieval.

Figure 3:
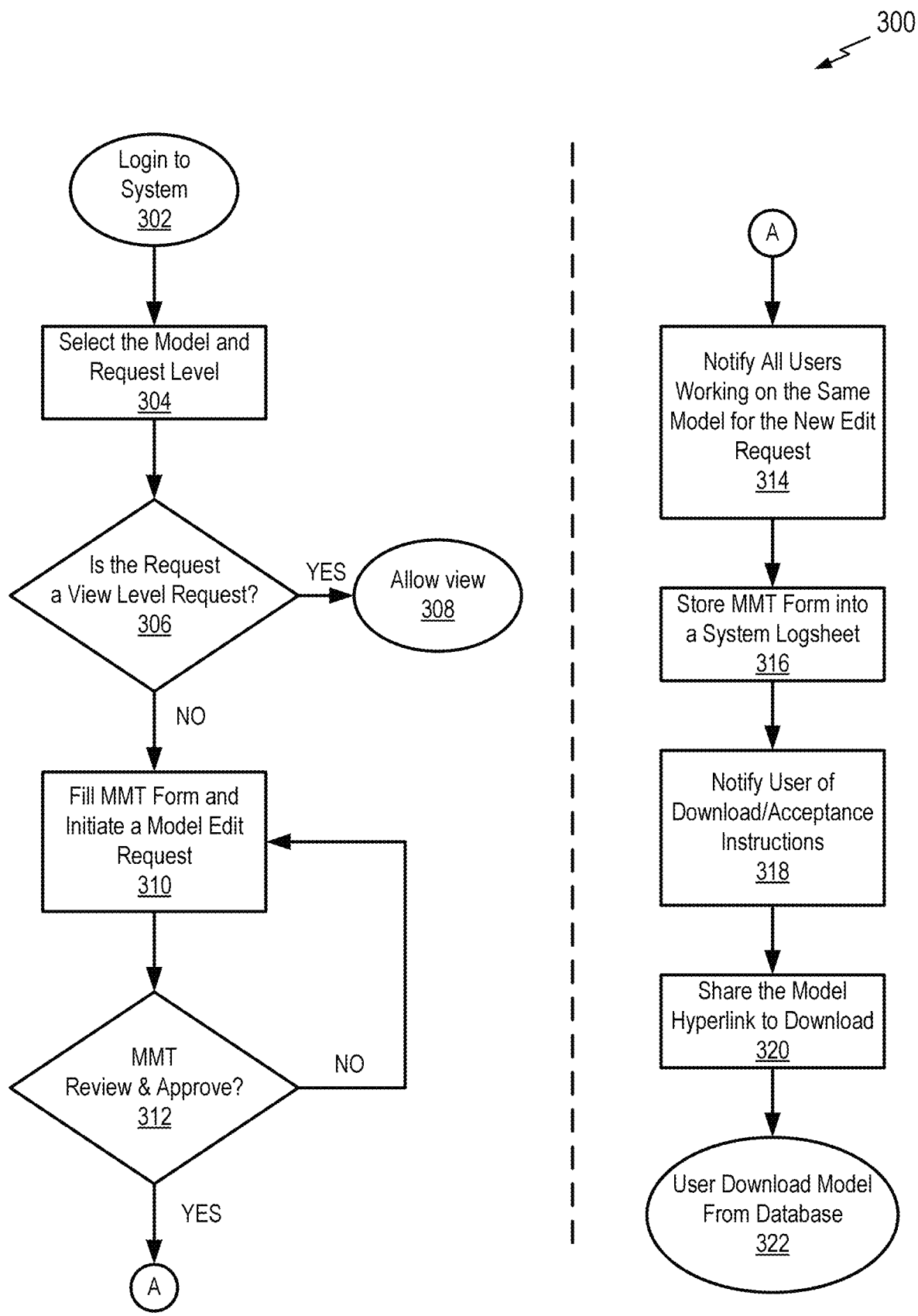
FIG. 3 depicts a flowchart outlining a process for users to obtain engineering models from the engineering model repository, according to embodiments provided herein.

FIG. 3 depicts a flowchart outlining a process 300 for users to obtain engineering models from the engineering model repository 210 (FIG. 2), in accordance with examples of the present disclosure. The process begins at block 302, where a user logs into a system webpage to access the engineering model repository 210 (FIG. 2). At block 304, the user selects the specific engineering model they require along with the level of access needed. For example, a user may select a level of access as either view only or edit access. If a view only access is selected (e.g., block 306), the user may be provided access to the engineering model with view only permission at block 308. This view only access level allows users to visualize the engineering model data but does not allow any edits or modifications to be made to the engineering model.

If an edit access is requested (306), a model edit request workflow is initiated, beginning at block 310. Here, the user can populate and digitally sign models management team (MMT) form to formally request editing rights for the specific engineering model. At block 312, the submitted MMT form is reviewed by the authorized MMT. If the request details are improperly filled or lacking necessary information, the MMT can reject the edit request at this block 312.

Upon MMT approval, at block 314 other users who have existing access to the same engineering model may be notified about this new edit request. This keeps different teams aware of updates being made to engineering models relevant to their work. As depicted in block 314 of FIG. 3, upon a MMT team approving a request to edit an engineering model, a notification module can automatically generate messages to alert other stakeholders currently accessing the same model about authorized edit activity. More specifically, embodiments can refer to the model repository's access logs (e.g., stored in the audit repository 212 (FIG. 2)) to retrieve identities of users that have been provisioned access privileges to the engineering model targeted in the approved edit request and/or view request during a past pre-configured duration. For example, the notification trigger may be configured to inform model stakeholders that have accessed the engineering model during the previous three months to ensure a most recent list of stakeholders is obtained. The notification parser 218 (FIG. 2) then collates contact handles like email addresses, messaging IDs and digital assistant route points for identified engineering model stakeholders.

Variants of structured notifications are then delivered to individual user contacts categorized as model editors and/or viewers through appropriate communication channels, where an appropriate communication channel may refer to company-approved modes of communicating sensitive operational information to personnel based on domain, geography and team composition considerations.

The notifications described above apprise editors working in parallel on connected equipment groups to adjust project plans to accommodate the incoming changes. Connected equipment groups refer to related infrastructure elements co-located or sharing operational dependencies. For instance, teams working on connecting pipeline networks may need to account for upstream pressure setting adjustments originating from a shared compressor station asset. Records of all triggered notifications around model edit events can be immutably logged within an audit history module. This creates full traceability pertaining to model change visibility across past and present user cohorts in case of future audits.

At block 316, details from the approved model request form can be stored into a central system log sheet that tracks the entire model access history. The edit requestor is then notified at block 318 confirming that edit rights have been granted along with relevant usage guidelines and reminders to coordinate work with other involved stakeholders for that engineering model. At block 320, a direct link to access and/or download the engineering model file for initiation of editing tasks is then shared with the requesting user. The user then downloads the engineering model from the engineering model repository 210 (FIG. 2) at block 322 to begin modifications as permitted by the usage guidelines.

Thus, FIG. 3 depicts a flowchart to safeguard engineering models while allowing tailored usage permissions to different user groups based on a review of formal edit/view requests. The different access levels, for example view only and edit, allow access to the engineering model with accompanying approval workflows; such access levels can prevent unauthorized modifications while enabling usage of engineering models for authorized purposes across various departments and external contractors.

For example, ACME Corporation has an oil refinery facility with vast interconnected operations managed through engineering models in a centralized model repository. A first user is a reliability engineer from ACME's maintenance department needing to diagnose a recent power outage in one of the crude oil distillation units. To troubleshoot the outage event, the first user logs into a portal of the engineering model transaction system 200 (FIG. 2) (block 302) and requests view access (block 304) for the engineering model of the affected distillation unit. As the first user requires read-only access for diagnostics, the system instantly approves and streams the unit's model data to the user's workstation (blocks 306-308). The user reviews the electrical and mechanical schematics over the past year to uncover any changes or abnormal wear-and-tear contributing to the power disruption.

In parallel, ACME Corporation has recently contracted an external firm NewTech Services to construct a new natural gas processing facility adjacent to the refinery unit. A second user, the lead design engineer from NewTech, needs to integrate ductwork and piping layouts for the new facility into ACME's central engineering model before commissioning. The second user logs into a portal of the engineering model transaction system 200 (FIG. 2) (block 302) and submits an MMT request (block 310) for editing the existing refinery model to add the new facility components. As edit permission is involved, the system initiates an engineered change review process to authorize the modification (blocks 312-322). This involves online submission of scope documents, the second user's design team credentials, intended changes, SPC pre-approvals and review by an MMT team having the ability to grant access and/or edit rights to such model-before granting edit access of the relevant refinery model region. In this example, the first user and the second user from different teams can access appropriate engineering model data per their project needs through structured authorization workflows while the system maintains tight governance of each engineering model.

Example Process for Uploading/Archiving Engineering Models

Figure 4:
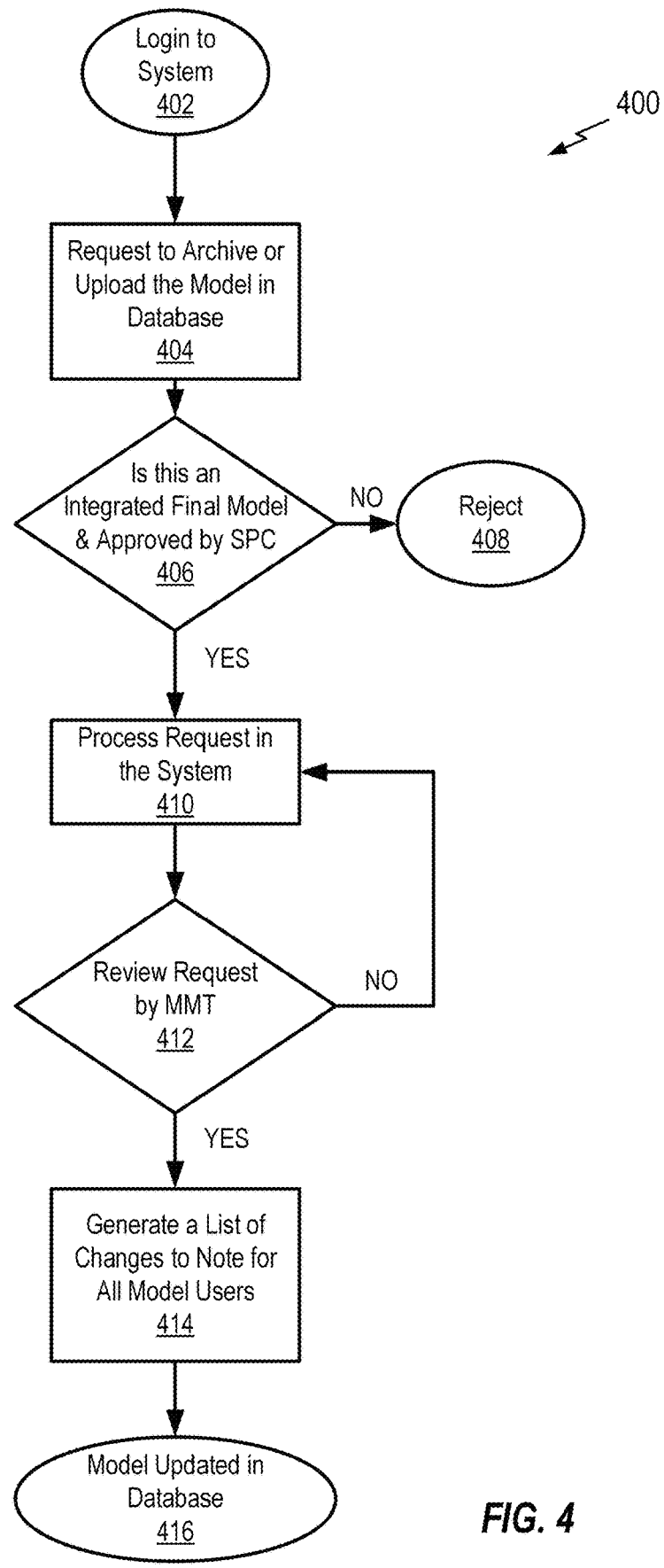
FIG. 4 depicts a flowchart outline a process for archiving existing engineering models and/or uploading new/modified engineering models into the engineering model repository, according to embodiments provided herein.

FIG. 4 depicts a flowchart outlining a process 400 for archiving existing engineering models and/or uploading new/modified engineering models into the engineering model repository 210 (FIG. 2), in accordance with examples of the present disclosure. The process begins at block 402, where an authorized user logs into a portal via a webpage of the system to access the engineering model repository 210 (FIG. 2).

At block 404, the user submits a request to archive an existing engineering model and/or upload a new/modified engineering model into the engineering model repository 210 (FIG. 2). At decision block 406, a determination is made regarding whether the engineering model accompanying the upload request is a final integrated model and approved by one or more team members of a standards and project committee (SPC) that oversees the standards and compliance related to the engineering models. The SPC interacts with the engineering model repository 210 (FIG. 2) to review and approve changes, ensuring that all engineering models remain consistent with the organization's policies and regulatory requirements. As part of the review process, engineering models proposed for upload are checked for parameters like model accuracy, integration with other connected infrastructure components, scenario testing results, and standards compliance. If the model fails to meet the required qualification criteria (block 406), the upload request is rejected at block 408, noting the reasons for rejection. If identified as an approved final integrated model, the upload/archive request may be processed at block 410.

An MMT review may be performed at block 412, wherein members of the MMT team evaluate information submitted along with the archive/upload request as per internal quality and process guidelines. The MMT review ensures that all engineering models uploaded to the central repository meet the specifications for integrity and interoperability.

Upon passing the MMT review block (412), at block 414, a list of changes between the old and newly uploaded engineering model versions may be generated. This change log contains details on aspects like equipment modifications, operational parameter updates, correlations with connected infrastructure components, etc. In some examples, the model change parser 216 (FIG. 2) may provide such change log and work in conjunction with the notification parser 218 and audit repository to identify stakeholders to receive one or more change notifications. The change notification is shared with all past and present users of that engineering model. Keeping user groups aware of model updates ensures continuity of information across teams and prevents/reduces fragmentation of the engineering models. Finally, at block 416, upon acceptance from both SPC and MMT review boards, the engineering model is formally committed to the repository with appropriate version histories, replacing older model variants.

Thus, FIG. 4 depicts a flowchart where new/modified engineering model uploads pass quality assurance reviews at both a functionality and standards level prior to securely being uploaded and archived in the engineering model repository 210 (FIG. 2). Review and approval cycles combined with automated change notifications promote model management protocols—preventing outdated, unintegrated models from being used and ensuring users have access to the most current engineering models essential for infrastructure and project activities.

As an example, EnerTech Inc, an energy consultancy firm, has been contracted by a public utility agency to perform a transmission infrastructure upgrade study. As part of the contract, EnerTech engineers need to incorporate several regional transmission models from the utility covering power grids, substations and distribution assets. Thus, the EnerTech project manager first logs into (e.g., block 402) the utility's portal and requests access to upload three transmission model files (e.g., block 404) upon project kick-off. A check is made regarding whether the submitted models are the final integrated models approved by the utility planning department (SPC check at block 406). On confirmation of SPC approval, EnerTech's upload request may be processed (block 410). The models then undergo an MMT review (block 412), assessing aspects such as data consistency with existing infrastructure, alignment with utility's modeling standards, access permissions to EnerTech, and secondary approvals from grid operations team.

On satisfying the quality checks (block 412), the models are uploaded to the centralized repository (block 416). A model version change log is auto-generated and circulated to the utility's planning, operations and maintenance departments apprising them of the new reference models introduced for the transmission upgrade project (block 414). After two months, the upgrade study is completed by EnerTech and the recommendations along with the modified models are due for submission to the utility planning team. The project manager logs in (block 402) and submits the final models for archival after the project closeout review. The SPC and MMT checks may be repeated (block 406-412) prior to permanently updating the repository with the latest model versions (block 416).

Figure 5:
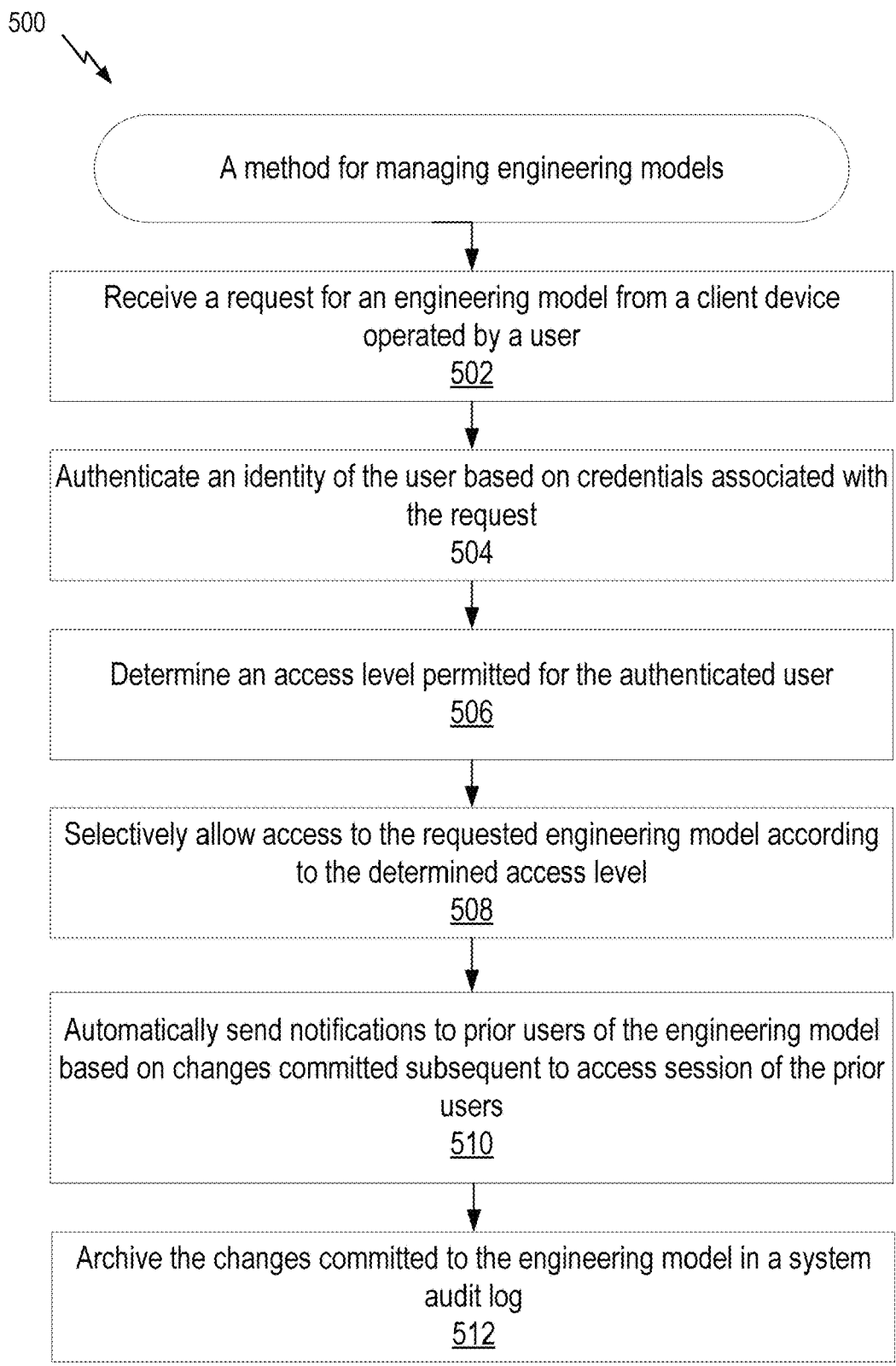
FIG. 5 depicts a flowchart for managing access to engineering models, according to embodiments provided herein.

FIG. 5 depicts an example process 500 for securing and managing access to engineering models in accordance with examples of the present disclosure. In one aspect, the process 500 can be implemented by one or more components of the system 100 (FIG. 1) for providing controllable hydrocarbon parameters based on managed engineering models and further includes an engineering model transaction system 200 (FIG. 2) configured to manage access and changes to an engineering model.

Process 500 starts at block 502 with receiving a request for an engineering model from a client device operated by a user. At block 504, an identity of the user may be authenticated based on credentials associated with the request. At block 506, an access level permitted for the authenticated user may be determined. At block 508, access to the requested engineering model may be selectively allowed according to the determined access level. At block 510, notifications may be automatically sent to prior users of the engineering model based on changes committed subsequent to access sessions of the prior users. At block 512, the changes committed to the engineering model may be archived in a system audit log.

Figure 6:
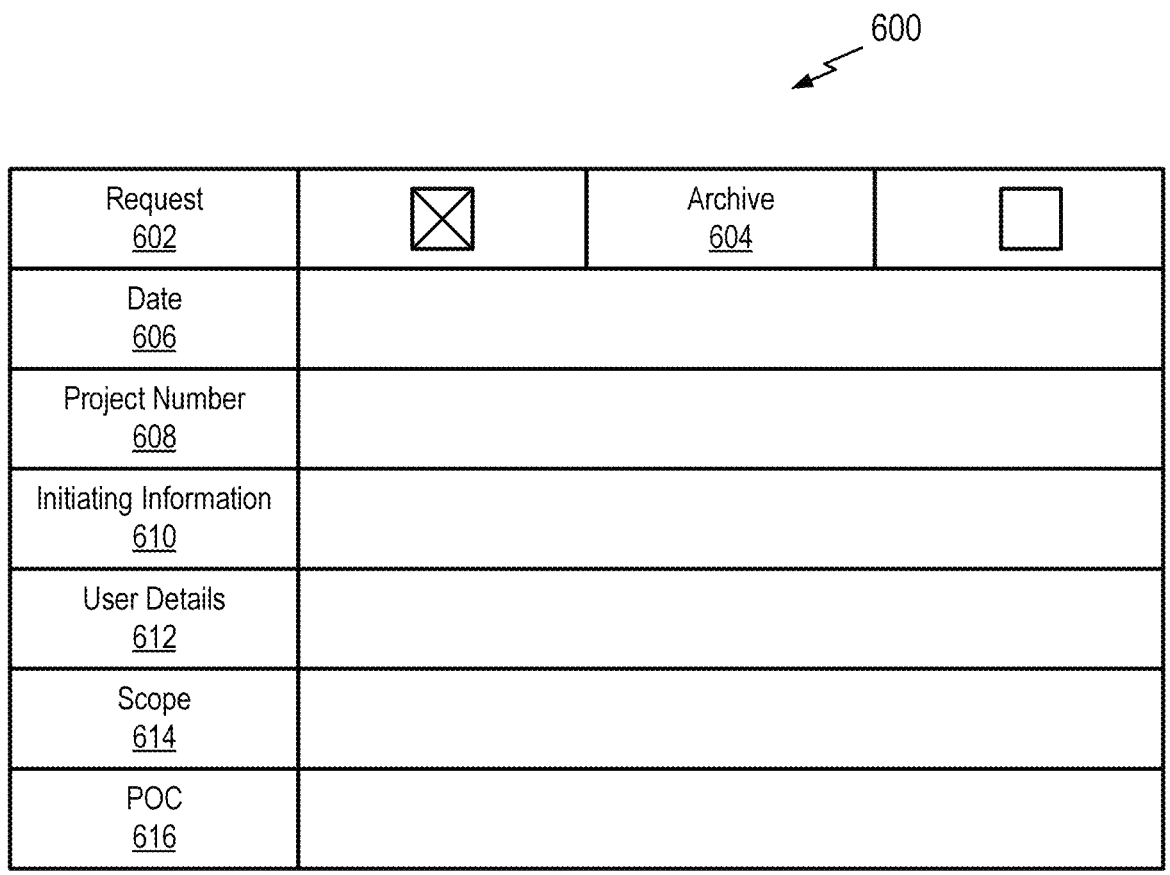
FIG. 6 depicts an exemplary model request/archive form, according to embodiments provided herein.

FIG. 6 illustrates an exemplary model request/archive form 600 utilized within the engineering model transaction system 200 (FIG. 2), in accordance with the present disclosure. This example form allows users to submit engineering model access requests or archive existing engineering models from the engineering model repository 210 (FIG. 2). The form 600 may include a request checkbox 602 for users to denote the nature of submission as a model access request or a model archive. That is, the archive checkbox 604 can be selected, indicating that the form is for archiving one or more existing engineering models from the engineering model repository 210 (FIG. 2).

The date of request submission 606 provides a timestamp to the form for tracking chronology of submissions. The project number section 608 ties the request or archive action to specific ongoing infrastructure projects. This linkage supports the asset-specific engineering activities aided by the model transaction associated with the form 600. The initiating information segment 610 allows users to provide background, scope explanation, and contextual narration to justify the requested model transaction. Details like asset name, site location, model type, previous model access permissions, and intended model usage are documented to establish grounds for the request or archive submission.

The user details section 612 captures submitting member particulars like department affiliation, contact information, and digital signature for user authentication. The scope portion 614 can be used to provide specifics like model access durations, feature permissions, user devices, and contractual clauses to precisely detail how the model is to be used. Additionally, submitters name a point of contact (POC) in section 616—an authority who takes on questions regarding the model request. The POC also oversees completion of model activities through regular progress tracking.

Thus, the example form 600 enables users to formally log model transactions requests before the engineering model transaction system 200 (FIG. 2). By collecting project environments, participant identities, permission scopes, and accountability metrics—the engineering model transaction system 200 (FIG. 2) can provide for a streamline approval flow for accessing engineering model data as needed by infrastructure projects. The example form 600 is an example of an MMT form as previously described.

FIG. 7 illustrates data structures utilized by the engineering model transaction system 200 (FIG. 2) for securing and managing access to engineering models in accordance with examples of the present disclosure. One or more of the data structures depicted in FIG. 6 may reside in one or more databases, repositories, or the like. The user data structure 702 stores registered member credentials like unique IDs 708, name 710, contact information 712, account status 714 and digital signature tokens 716 for identity verification. The modeled digital signatures authenticate records and transactions performed by users across the system.

The model data structure 704 acts as a metadata store housing engineering model indices 718, storage locations 722, facilities name 720, description 724, model size 728, equipment counts and model point of contacts 730 for subject matter assistance. Descriptive fields can be used to retrieve models for project requirements while minimizing access to restricted data sets. The request data structure 706 maintains granular records of engineering model access and modification requests. Details on request ID 732, user IDs 734, model IDs 736, access duration (e.g., 738-740), access mode 742, request status 744, approval status (746-748), and reviewers are logged or recorded within the request data structure 706. This supports auditability and accessibility analysis of engineering models accessed across business units.

Relationships between user IDs, model IDs and request IDs create intersections across these data structures enabling secure management and controlled access of engineering models. For instance, linkages between people, digital assets and system transactions allow tracking model access to individuals. Together, the logical schema presented through related data structures provides digital tracing between critical entities-users, models and access transactions. The ability to digitally trace events provides analytics of user behavior, model access trends, system performance and policy conformance required for decision support and audit reviews within the system 100 for securing and managing access to engineering models.

Figure 8:
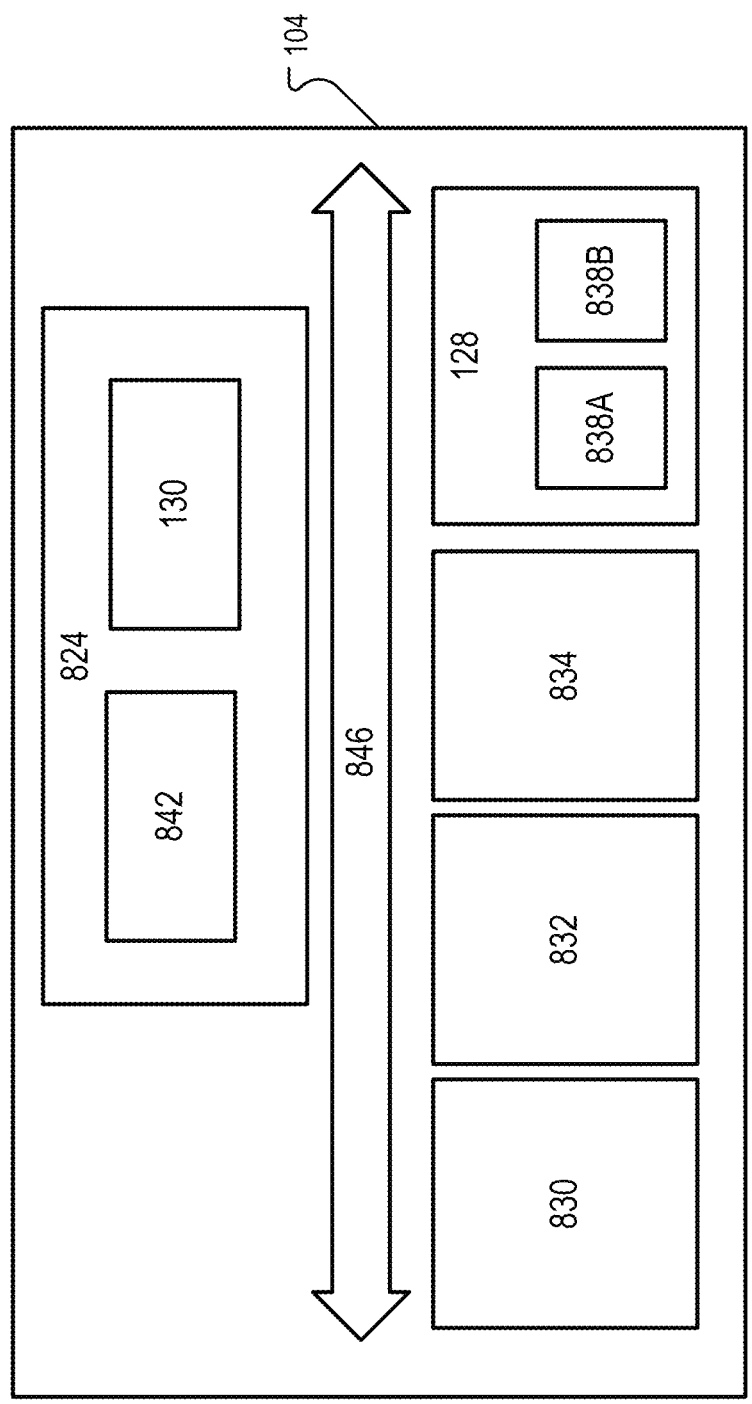
FIG. 8 depicts a computing device for an engineering model transaction system, according to embodiments provided herein.

FIG. 8 depicts a computing device for an engineering model transaction system 104 providing controllable hydrocarbon parameters based on managed engineering models according to embodiments provided herein. As illustrated, the engineering model transaction system 104 includes a processor 830, input/output hardware 832, a network interface hardware 834, a sensor data memory 128 (which stores device data 838A, location data 838B, and/or other data, such as abstraction layer data), and a memory component 824. The memory component 824 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable mediums. Depending on the particular embodiment, these non-transitory computer-readable mediums may reside within the engineering model transaction system 104 and/or external to the engineering model transaction system 104.

The memory component 824 may store operating logic 842 and the engineering model data processor 130. Both of these logic components may include a plurality of different pieces of logic (such as depicted in FIG. 2), each of which may be embodied as a computer program, firmware, and/or hardware, as an example. A local communications interface 846 is also included in FIG. 8 and may be implemented as a bus or other communication interface to facilitate communication among the components of the engineering model transaction system 104.

The processor 830 may include any processing component operable to receive and execute instructions (such as from a memory component 824 and/or the sensor data memory 128). As described above, the input/output hardware 832 may include and/or be configured to interface with speakers, microphones, and/or other input/output components.

The network interface hardware 834 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the engineering model transaction system 104 and other computing devices.

The operating logic 842 may include an operating system and/or other software for managing components of the engineering model transaction system 104. As discussed above, the engineering model data processor 130 may reside in the memory component 824 and may be configured to cause the processor 830 to create one or more components described in FIG. 2 and/or perform other functions provided herein.

It should be understood that while the components in FIG. 8 are illustrated as residing within the engineering model transaction system 104, this is merely an example. In some embodiments, one or more of the components may reside external to the engineering model transaction system 104 or within other devices. It should also be understood that, while the engineering model transaction system 104 is illustrated as a single device, this is also merely an example. In some embodiments, the operating logic 842 and the engineering model data processor 130 may reside on different devices.

Additionally, while the engineering model transaction system 104 is illustrated with the operating logic 842 and the engineering model data processor 130 as separate logical components, this is also an example. In some embodiments, a single piece of logic may provide the described functionality. It should also be understood that while the operating logic 842 and the engineering model data processor 130 are described herein as the logical components, this is also an example. Other components may also be included, depending on the embodiment.

While particular embodiments and aspects of the present disclosure have been illustrated and provided herein, various other changes and modifications can be made without departing from the spirit and scope of the disclosure. Moreover, although various aspects have been provided herein, such aspects need not be utilized in combination. Accordingly, it is therefore intended that the appended claims cover all such changes and modifications that are within the scope of the embodiments shown and provided herein.

Various aspects for providing controllable hydrocarbon parameters to at least one of a controllable hydrocarbon infrastructure asset or a controllable hydrocarbon operational asset are disclosed. Specifically, a first aspect includes a system for providing controllable hydrocarbon parameters to at least one of a controllable hydrocarbon infrastructure asset or a controllable hydrocarbon operational asset, the system comprising: at least one sensor coupled to a first network, the at least one sensor configured to obtain sensor data associated with the at least one of the controllable hydrocarbon infrastructure asset or the controllable hydrocarbon operational asset; an engineering model transaction system that includes a processor, a sensor data memory, a memory component, and a configuration parameter output translation module, the sensor data memory storing sensor data received from the first network and associated with the at least one of the controllable hydrocarbon infrastructure asset or the controllable hydrocarbon operational asset, and the memory component storing engineering model data processing instructions, that when executed by the processor, causes the engineering model transaction system to perform at least the following: receive, from a client device, a request for an engineering model at an engineering model repository interface configured as an access point to an engineering model repository maintaining a database of engineering models; log the request for the engineering model into an audit repository; authenticate, by an authenticator, an identity of a user based on credentials associated with the request for the engineering model; determine, by the authenticator and the engineering model repository, an access level permitted for the authenticated user; selectively allow access to the requested engineering model according to the determined access level and log access to the requested engineering model into the audit repository; receive a change request associated with the engineering model and log the received change request into the audit repository; based on the determined access level, approve the change request and commit a revised engineering model into the engineering model repository; determine, by an engineering model change parser, differences between the requested engineering model and the revised engineering model; parse entries logged within the audit repository to locate transaction records that identify prior users of the requested engineering model based on the determined differences between the requested engineering model and the revised engineering model; send at least one notification message to one or more of the identified prior users of the requested engineering model, wherein the at least one notification includes at least one the logged requests for the engineering model, logged engineering model change requests, or logged engineering model access transactions from the audit repository; receive the sensor data from the sensor data memory; process the sensor data with the revised engineering model to obtain at least one configuration parameter for a controller associated with the at least one of the controllable hydrocarbon infrastructure asset or the controllable hydrocarbon operational asset; and communicate the at least one configuration parameter to the controller associated with the at least one of the controllable hydrocarbon infrastructure asset or the controllable hydrocarbon operational asset, wherein upon receiving the at least one configuration parameter, the controller modifies at least one operating condition of the at least one of the infrastructure asset or the operational asset.

A second aspect includes the system of the first aspect, wherein the access level permitted for the authenticated user is determined based at least in part on permissions associated with the engineering model in the engineering model repository.

A third aspect includes the system of the first aspect, wherein parsed changes to the engineering model include at least one of equipment updates, operating parameter changes, or data corrections.

A fourth aspect includes the system of the first aspect, wherein the sensor data memory further stores location data associated with the at least one sensor or abstraction layer data associated with the at least one of the controllable hydrocarbon infrastructure asset or the controllable hydrocarbon operational asset.

A fifth aspect includes the system of the first aspect, wherein the configuration parameter output translation module is further configured to create instructions for implementing modified configuration parameters output from the processing of the sensor data with the revised engineering model.

A sixth aspect includes the system of the first aspect, further comprising a model change simulator configured to detect if proposed engineering model changes would cause downstream components to exceed process ratings.

A seventh aspect includes the system of the first aspect, wherein the model change simulator is configured to notify the authenticated user to adjust proposed changes to mitigate risks of disrupting one or more interconnected components.

An eighth aspect includes the system of the first aspect, wherein the at least one configuration parameter provided to the controller updates set points for at least one of temperature, pressure, speed, or power consumption associated with operation of the at least one of the controllable hydrocarbon infrastructure asset or the controllable hydrocarbon operational asset.

A ninth aspect includes the system of the first aspect, wherein a model change simulator utilizes one or more machine learning models trained on component connections and operational dependencies to identify proposed engineering model changes that would impact downstream infrastructure assets or operational assets.

A tenth aspect includes the system of the first aspect, wherein the model change simulator is further configured to generate notifications to additional stakeholders predicted to be affected by the proposed engineering model changes.

An eleventh aspect includes the system of the first aspect, further comprising a digital twin module, wherein the model change simulator is configured to propagate committed engineering model changes to the digital twin module to update a simulated representation of the at least one of the controllable hydrocarbon infrastructure asset or the controllable hydrocarbon operational asset, the digital twin module further configured to process real-time sensor data streams from the sensor data memory, compare outputs with the simulated representation, and provide configuration updates to synchronize one or more devices of one or more infrastructure assets or operational assets.

A twelfth aspect includes the system of the first aspect, wherein a notification parser is configured to select audit history events related to model extractions, failed access attempts, parameter edits, or simulations to pass to a notification manager for communicating trends to respective personnel.

A thirteenth aspect includes the system of the first aspect, wherein the notification parser is configured to examine a configurable time window of audit repository entries to locate engineering model transaction records needing stakeholder notifications based on transaction metadata attributes.

A fourteenth aspects is includes a method for providing controllable hydrocarbon parameters to at least one of a controllable hydrocarbon infrastructure asset or a controllable hydrocarbon operational asset, the method comprising: receiving, from a client device, a request for an engineering model at an engineering model repository interface configured as an access point to an engineering model repository maintaining a database of engineering models; logging the request for the engineering model into an audit repository; authenticating, by an authenticator, an identity of a user based on credentials associated with the request for the engineering model; determining, by the authenticator and the engineering model repository, an access level permitted for the authenticated user; selectively allowing access to the requested engineering model according to the determined access level and log access to the requested engineering model into the audit repository; receiving a change request associated with the engineering model and log the received change request into the audit repository; based on the determined access level, approving the change request and commit a revised engineering model into the engineering model repository; determining, by an engineering model change parser, differences between the requested engineering model and the revised engineering model; parsing entries logged within the audit repository to locate transaction records that identify prior users of the requested engineering model based on the determined differences between the requested engineering model and the revised engineering model; sending at least one notification message to one or more of the identified prior users of the requested engineering model, wherein the at least one notification includes at least one the logged requests for the engineering model, logged engineering model change requests, or logged engineering model access transactions from the audit repository; receiving sensor data from sensor data memory; processing the sensor data with the revised engineering model to obtain at least one configuration parameter for a controller associated with the at least one of the controllable hydrocarbon infrastructure asset or the controllable hydrocarbon operational asset; and communicating the at least one configuration parameter to the controller associated with the at least one of the controllable hydrocarbon infrastructure asset or the controllable hydrocarbon operational asset, wherein upon receiving the at least one configuration parameter, the controller modifies at least one operating condition of the at least one of the infrastructure asset or the operational asset.

A fifteenth aspect includes the fourteenth aspect, further comprising notifying the authenticated user to adjust proposed changes to mitigate risks of disrupting one or more interconnected components.

A sixteenth aspect includes the fourteenth aspect, wherein the at least one configuration parameter provided to the controller updates set points for at least one of temperature, pressure, speed, or power consumption associated with operation of the at least one of the controllable hydrocarbon infrastructure asset or the controllable hydrocarbon operational asset.

A seventeenth aspect includes the fourteenth aspect, further comprising utilizing one or more machine learning models trained on component connections and operational dependencies to identify proposed engineering model changes that would impact downstream infrastructure assets or operational assets.

An eighteenth aspect includes the fourteenth aspect, further comprising generating notifications to additional stakeholders predicted to be affected by proposed engineering model changes.

A nineteenth aspect includes the fourteenth aspect, further comprising propagating committed engineering model changes to a digital twin module and updating a simulated representation of the at least one of the controllable hydrocarbon infrastructure asset or the controllable hydrocarbon operational asset, the digital twin module further configured to process real-time sensor data streams from the sensor data memory, compare outputs with the simulated representation, and provide configuration updates to synchronize one or more devices of one or more infrastructure assets or operational assets.

A twentieth aspect includes the fourteenth aspect, further comprising selecting audit history events related to model extractions, failed access attempts, parameter edits, or simulations to pass to a notification manager for communicating trends to respective personnel.

A twenty-first aspect includes a non-transitory computer-readable storage medium that that stores logic that, when executed by a computing device, causes the computing device to perform at least the following: receive, from a client device, a request for an engineering model at an engineering model repository interface configured as an access point to an engineering model repository maintaining a database of engineering models; log the request for the engineering model into an audit repository; authenticate, by an authenticator, an identity of a user based on credentials associated with the request for the engineering model; determine, by the authenticator and the engineering model repository, an access level permitted for the authenticated user; selectively allow access to the requested engineering model according to the determined access level and log access to the requested engineering model into the audit repository; receive a change request associated with the engineering model and log the received change request into the audit repository; based on the determined access level, approve the change request and commit a revised engineering model into the engineering model repository; determine, by an engineering model change parser, differences between the requested engineering model and the revised engineering model; parse entries logged within the audit repository to locate transaction records that identify prior users of the requested engineering model based on the determined differences between the requested engineering model and the revised engineering model; send at least one notification message to one or more of the identified prior users of the requested engineering model, wherein the at least one notification includes at least one the logged requests for the engineering model, logged engineering model change requests, or logged engineering model access transactions from the audit repository; receive sensor data from sensor data memory; process the sensor data with the revised engineering model to obtain at least one configuration parameter for a controller associated with at least one of a controllable hydrocarbon infrastructure asset or a controllable hydrocarbon operational asset; and communicate the at least one configuration parameter to the controller associated with the at least one of the controllable hydrocarbon infrastructure asset or the controllable hydrocarbon operational asset, wherein upon receiving the at least one configuration parameter, the controller modifies at least one operating condition of the at least one of the infrastructure asset or the operational asset.

It should now be understood that embodiments disclosed herein include systems, methods, and non-transitory computer-readable mediums for providing controllable hydrocarbon parameters to at least one of a controllable hydrocarbon infrastructure asset or a controllable hydrocarbon operational asset. It should also be understood that these embodiments are merely exemplary and are not intended to limit the scope of this disclosure.

What is claimed is:

1. A system for providing controllable hydrocarbon parameters to at least one of a controllable hydrocarbon infrastructure asset or a controllable hydrocarbon operational asset, comprising:
   at least one sensor coupled to a first network, the at least one sensor configured to obtain sensor data associated with the at least one of the controllable hydrocarbon infrastructure asset or the controllable hydrocarbon operational asset;
   an engineering model transaction system that includes a processor, a sensor data memory, a memory component, and a configuration parameter output translation module, the sensor data memory storing sensor data received from the first network and associated with the at least one of the controllable hydrocarbon infrastructure asset or the controllable hydrocarbon operational asset, and the memory component storing engineering model data processing instructions, that when executed by the processor, causes the engineering model transaction system to perform at least the following:
   receive, from a client device, a request for an engineering model at an engineering model repository interface configured as an access point to an engineering model repository maintaining a database of engineering models;
   log the request for the engineering model into an audit repository;
   authenticate, by an authenticator, an identity of a user based on credentials associated with the request for the engineering model;
   determine, by the authenticator and the engineering model repository, an access level permitted for the authenticated user;

selectively allow access to the requested engineering model according to the determined access level and log access to the requested engineering model into the audit repository;

receive a change request associated with the engineering model and log the received change request into the audit repository;

based on the determined access level, approve the change request and commit a revised engineering model into the engineering model repository;

determine, by an engineering model change parser, differences between the requested engineering model and the revised engineering model;

parse entries logged within the audit repository to locate transaction records that identify prior users of the requested engineering model based on the determined differences between the requested engineering model and the revised engineering model;

send at least one notification message to one or more of the identified prior users of the requested engineering model, wherein the at least one notification includes at least one of the logged requests for the engineering model, logged engineering model change requests, or logged engineering model access transactions from the audit repository;

receive the sensor data from the sensor data memory;

process the sensor data with the revised engineering model to obtain at least one configuration parameter for a controller associated with the at least one of the controllable hydrocarbon infrastructure asset or the controllable hydrocarbon operational asset; and communicate the at least one configuration parameter to the controller associated with the at least one of the controllable hydrocarbon infrastructure asset or the controllable hydrocarbon operational asset, wherein upon receiving the at least one configuration parameter, the controller modifies at least one operating condition of the at least one of the controllable hydrocarbon infrastructure asset or the controllable hydrocarbon operational asset.

2. The system of claim 1, wherein the access level permitted for the authenticated user is determined based at least in part on permissions associated with the engineering model in the engineering model repository.

3. The system of claim 1, wherein parsed changes to the engineering model include at least one of equipment updates, operating parameter changes, or data corrections.

4. The system of claim 1, wherein the sensor data memory further stores location data associated with the at least one sensor or abstraction layer data associated with the at least one of the controllable hydrocarbon infrastructure asset or the controllable hydrocarbon operational asset.

5. The system of claim 1, wherein the configuration parameter output translation module is further configured to create instructions for implementing modified configuration parameters output from the processing of the sensor data with the revised engineering model.

6. The system of claim 1, further comprising a model change simulator configured to detect if proposed engineering model changes would cause downstream components to exceed process ratings.

7. The system of claim 6, wherein the model change simulator is configured to notify the authenticated user to adjust proposed changes to mitigate risks of disrupting one or more interconnected components.

8. The system of claim 1, wherein the at least one configuration parameter provided to the controller updates setpoints for at least one of temperature, pressure, speed, or power consumption associated with operation of the at least one of the controllable hydrocarbon infrastructure asset or the controllable hydrocarbon operational asset.

9. The system of claim 1, wherein a model change simulator utilizes one or more machine learning models trained on component connections and operational dependencies to identify proposed engineering model changes that would impact downstream infrastructure assets or operational assets.

10. The system of claim 9, further comprising a digital twin module, wherein the model change simulator is configured to propagate committed engineering model changes to the digital twin module to update a simulated representation of the at least one of the controllable hydrocarbon infrastructure asset or the controllable hydrocarbon operational asset, the digital twin module further configured to process real-time sensor data streams from the sensor data memory, compare outputs with the simulated representation, and provide configuration updates to synchronize one or more devices of one or more infrastructure assets or operational assets.

11. The system of claim 1, wherein a notification parser is configured to select audit history events related to model extractions, failed access attempts, parameter edits, or simulations to pass to a notification manager for communicating trends to respective personnel.

12. The system of claim 11, wherein the notification parser is configured to examine a configurable time window of audit repository entries to locate engineering model transaction records needing stakeholder notifications based on transaction metadata attributes.

13. A non-transitory computer-readable storage medium that that stores logic that, when executed by a computing device, causes the computing device to perform at least the following:

receive, from a client device, a request for an engineering model at an engineering model repository interface configured as an access point to an engineering model repository maintaining a database of engineering models;

log the request for the engineering model into an audit repository;

authenticate, by an authenticator, an identity of a user based on credentials associated with the request for the engineering model;

determine, by the authenticator and the engineering model repository, an access level permitted for the authenticated user;

selectively allow access to the requested engineering model according to the determined access level and log access to the requested engineering model into the audit repository;

receive a change request associated with the engineering model and log the received change request into the audit repository;

based on the determined access level, approve the change request and commit a revised engineering model into the engineering model repository;

determine, by an engineering model change parser, differences between the requested engineering model and the revised engineering model;

parse entries logged within the audit repository to locate transaction records that identify prior users of the requested engineering model based on the determined differences between the requested engineering model and the revised engineering model;

send at least one notification message to one or more of the identified prior users of the requested engineering model, wherein the at least one notification includes at least one of the logged requests for the engineering model, logged engineering model change requests, or logged engineering model access transactions from the audit repository;

receive sensor data from sensor data memory;

process the sensor data with the revised engineering model to obtain at least one configuration parameter for a controller associated with at least one of a controllable hydrocarbon infrastructure asset or a controllable hydrocarbon operational asset; and communicate the at least one configuration parameter to the controller associated with the at least one of the controllable hydrocarbon infrastructure asset or the controllable hydrocarbon operational asset, wherein upon receiving the at least one configuration parameter, the controller modifies at least one operating condition of the at least one of the controllable hydrocarbon infrastructure asset or the controllable hydrocarbon operational asset.

14. A method for providing controllable hydrocarbon parameters to at least one of a controllable hydrocarbon infrastructure asset or a controllable hydrocarbon operational asset, the method comprising:

receiving, from a client device, a request for an engineering model at an engineering model repository interface configured as an access point to an engineering model repository maintaining a database of engineering models;

logging the request for the engineering model into an audit repository;

authenticating, by an authenticator, an identity of a user based on credentials associated with the request for the engineering model;

determining, by the authenticator and the engineering model repository, an access level permitted for the authenticated user;

selectively allowing access to the requested engineering model according to the determined access level and log access to the requested engineering model into the audit repository;

receiving a change request associated with the engineering model and log the received change request into the audit repository;

based on the determined access level, approving the change request and commit a revised engineering model into the engineering model repository;

determining, by an engineering model change parser, differences between the requested engineering model and the revised engineering model;

parsing entries logged within the audit repository to locate transaction records that identify prior users of the requested engineering model based on the determined differences between the requested engineering model and the revised engineering model;

sending at least one notification message to one or more of the identified prior users of the requested engineering model, wherein the at least one notification includes at least one of the logged requests for the engineering model, logged engineering model change requests, or logged engineering model access transactions from the audit repository;

receiving sensor data from sensor data memory;

processing the sensor data with the revised engineering model to obtain at least one configuration parameter for a controller associated with the at least one of the controllable hydrocarbon infrastructure asset or the controllable hydrocarbon operational asset; and communicating the at least one configuration parameter to the controller associated with the at least one of the controllable hydrocarbon infrastructure asset or the controllable hydrocarbon operational asset, wherein upon receiving the at least one configuration parameter, the controller modifies at least one operating condition of the at least one of the controllable hydrocarbon infrastructure asset or the controllable hydrocarbon operational asset.

15. The method of claim 14, further comprising notifying the authenticated user to adjust proposed changes to mitigate risks of disrupting one or more interconnected components.

16. The method of claim 14, wherein the at least one configuration parameter provided to the controller updates setpoints for at least one of temperature, pressure, speed, or power consumption associated with operation of the at least one of the controllable hydrocarbon infrastructure asset or the controllable hydrocarbon operational asset.

17. The method of claim 14, further comprising utilizing one or more machine learning models trained on component connections and operational dependencies to identify proposed engineering model changes that would impact downstream infrastructure assets or operational assets.

18. The method of claim 14, further comprising generating notifications to additional stakeholders predicted to be affected by proposed engineering model changes.

19. The method of claim 14, further comprising propagating committed engineering model changes to a digital twin module and updating a simulated representation of the at least one of the controllable hydrocarbon infrastructure asset or the controllable hydrocarbon operational asset, the digital twin module further configured to process real-time sensor data streams from the sensor data memory, compare outputs with the simulated representation, and provide configuration updates to synchronize one or more devices of one or more infrastructure assets or operational assets.

20. The system of claim 1, further comprising selecting audit history events related to model extractions, failed access attempts, parameter edits, or simulations to pass to a notification manager for communicating trends to respective personnel.

* * * * *

UNITED STATES PATENT AND TRADEMARK OFFICE
CERTIFICATE OF CORRECTION

PATENT NO. : 12,450,320 B2  
APPLICATION NO. : 18/583496  
DATED : October 21, 2025  
INVENTOR(S) : Gamaleldin et al.

Page 1 of 1

It is certified that error appears in the above-identified patent and that said Letters Patent is hereby corrected as shown below:

In the Specification

Column 19, Line 47, replace "readable storage medium that that stores logic that, when" with --readable storage medium that stores logic that, when--.

In the Claims

Column 22, Claim 13, Line 34, replace "that that stores logic that, when executed by a computing" with --that stores logic that, when executed by a computing--.

Signed and Sealed this  
Twenty-fifth Day of November, 2025

John A. Squires  
*Director of the United States Patent and Trademark Office*